United States Patent

Kato et al.

[11] Patent Number: 5,248,921
[45] Date of Patent: Sep. 28, 1993

[54] SERVO MOTOR CONTROL DEVICE

[75] Inventors: Masamichi Kato, Kuwana; Takatomo Izume, Urawa; Kouichi Yumita, Tokyo, all of Japan

[73] Assignee: Kabushiki Kaisha Toshiba, Kanagawa, Japan

[21] Appl. No.: 949,725

[22] Filed: Sep. 23, 1992

[30] Foreign Application Priority Data

Sep. 25, 1991 [JP] Japan .................. 3-245905

[51] Int. Cl.$^5$ .......................... F15B 9/00
[52] U.S. Cl. ......................... 318/560; 318/561;
318/609; 318/610; 318/568.1; 364/157; 364/163
[58] Field of Search ........... 318/560-646;
364/140-169; 395/80-89; 901/3, 5, 7, 9, 12, 13, 15-23

[56] References Cited

U.S. PATENT DOCUMENTS

| | | | |
|---|---|---|---|
| 4,763,055 | 8/1988 | Daggett et al. | 318/565 X |
| 4,807,153 | 2/1989 | Onaga et al. | 318/563 X |
| 4,868,474 | 9/1989 | Lancraft et al. | 318/562 |
| 4,874,997 | 10/1989 | Daggett et al. | 318/565 X |
| 4,876,494 | 10/1989 | Daggett et al. | 318/567 X |
| 4,888,536 | 12/1989 | Sakai et al. | 318/592 |
| 5,107,193 | 4/1992 | Iwashita | 318/560 |
| 5,119,006 | 6/1992 | Torii et al. | 318/640 |
| 5,157,597 | 10/1992 | Iwashita | 318/561 X |

*Primary Examiner*—Paul Ip
*Attorney, Agent, or Firm*—Limbach & Limbach

[57] ABSTRACT

In a control device for controlling a servo motor driving a robot arm, a target position command signal is input to a first operation section, which generates a speed command value for the speed feedforward. The target position command signal is also input to a delay section. A target position command signal delayed by a time period is obtained by the delay section and supplied to a second operation section. A positional deviation between the target position command signal and a position feedback signal is calculated by the second operation section. The obtained positional deviation is input to a third operation section and generated as a speed compensation command signal. A speed command signal obtained by addition of the speed feedforward signal and the speed compensation command signal is supplied to a servo driver for driving the servo motor. As a result, the time lag in the response of a system of the controlled system after the servo driver can be compensated for and an error in the positional deviation or the speed command signal can be prevented from being increased.

2 Claims, 4 Drawing Sheets

SERVO MOTOR CONTROL DEVICE

BACKGROUND OF THE INVENTION

1. Field of the invention

This invention relates to a servo motor control device employed in a positioning control system using a servo motor, such as an NC machining system or industrial robots, and more particularly to such a servo motor control device wherein a servo motor is controlled by means of a position feedback signal and a speed feedforward signal.

2. Description of the prior art

A feedback control system has been employed in the positioning control system of the industrial robot, for example. This control system performs the positioning control, calculating the deviation between a target position and a current position.

The above-mentioned feedback control is usually divided into stages of position loop, speed loop and electric current loop. In the stage of the position loop, the deviation between the target position of the robot and its current position is calculated and a result obtained from the calculation is multiplied by a position loop transfer function so that a speed command is obtained. In the stage of the speed loop, the deviation between a value of the speed command obtained in the stage of the position loop and the current speed is calculated. A result obtained from the calculation is multiplied by a speed loop transfer function so that a torque command is obtained. In the stage of the electric current loop, the deviation between a value of the torque command obtained in the stage of the speed loop and an actual value of current flowing into the servo motor is calculated. A result obtained from the calculation is multiplied by a current loop transfer function so that a current command is obtained. The current flowing into the servo motor is controlled by the obtained current command. The control in each of the stages is performed based on command values obtained from combination of proportional, integral, differential and other control manners.

A general purpose servo driver is usually used for the speed and current loops. Accordingly, a control device is composed of the servo driver and a position control section delivering a speed command signal based on the position feedback.

A target speed in the case where an arm of the robot is moved is shown by a trapezoidal smooth curve as shown in FIG. 5, for example. This target speed is integrated and the result is supplied as a target position command to the position control section. In order that a sudden change in the speed is avoided, acceleration at the respective times of start and termination of positive and negative accelerations is smoothly increase and reduced, thereby preventing occurrence of vibration. Thus, a settling time for positioning the robot arm at the target position can be shortened.

However, the response of the servo motor depends upon the positional deviation in the control by the position feedback. When the position feedback is performed by the proportional control, for example, time constants of the machine, speed loop and position loop and the time lag of the servo driver in its control cause a speed feedback waveform to respond with a time lag relative to the target speed command value, as is shown in FIG. 8. Consequently, a response time is disadvantageously increased.

A speed feedforward control has been recently performed for the purpose of improvement of the above-described responsibility. In the speed feedforward control, the value of the target speed command is added to the speed command value to the servo driver. However, if the feedforward control is being performed when a gain of the loop of the position control is increased for improvement of the responsibility, a controlled variable in accordance with the positional deviation at that time is added to the amount of feedforward based on the target speed command value and the result of this addition becomes the speed command value for the servo driver. Accordingly, an amount of positional deviation is increased as the result of time lag in response in the system after the servo driver. Consequently, the speed command deviates from the target speed command value at the time of acceleration so that the speed command becomes larger than the target speed command value. Thus, there is a problem that the waveform of the speed command value supplied to the servo driver deviates from the waveform of the target speed command value in the speed feedforward control.

As described above, in the case of the speed feedforward, a lag element in the system after the servo driver increases the positional deviation at the times of acceleration and deceleration. Accordingly, as shown in FIG. 9, the waveform of the speed command value for the servo driver deviates from the waveform of the target speed command value. Consequently, the vibration is produced and the settling time is increased.

SUMMARY OF THE INVENTION

Therefore, an object of the present invention is to provide a servo motor control device wherein an error in the positional deviation due to the time lag in the system after the servo driver, for example, a system between the servo driver and the position feedback output generating means, can be prevented from being increased so that the speed command signal supplied to the servo driver can be approximated to the target value.

The present invention provides an improved servo motor control device for driving, through a servo driver, a servo motor as a drive source of a controlled system. The servo motor control device comprises means for generating a target position command signal for the controlled system, means for generating a position feedback signal from the controlled system, means for generating a speed feedforward signal in accordance with the target position command signal, delay means for delaying the target position command signal in accordance with a response time of a system of the controlled system after the servo driver, means for comparing the delayed target position command signal with the position feedback signal and obtaining a positional deviation, means for generating a speed compensation command signal in accordance with the positional deviation, and means for obtaining a speed command signal whose value is in accordance with an addition of the speed compensation command signal and the speed feedforward signal, and delivering the obtained speed command signal to the servo driver.

In accordance with the above-described servo motor control device, the speed command signal delivered to the servo driver takes a value obtained by adding the value of the speed compensation command signal in accordance with the position feedback signal to the value of the speed feedforward signal in accordance with the target position command signal. The servo motor is controlled by the speed command signal. The speed compensation command signal is in accordance with the positional deviation obtained by comparison between the target position command signal and the position feedback signal. The target position command signal used for the comparison is delayed in accordance with the response time of the portion of the controlled system after the servo driver. Consequently, a degree of influence of a delay time upon an error in the obtained positional deviation can be reduced.

Other objects of the present invention will become obvious upon understanding of the illustrative embodiment about to be described. Various advantages not referred to herein will occur to one skilled in the art upon employment of the invention in practice.

BRIEF DESCRIPTION OF THE DRAWINGS

Embodiments of the present invention will be described with reference to the accompanying drawings in which.

DESCRIPTION OF THE PREFERRED EMBODIMENTS

Figure 1:
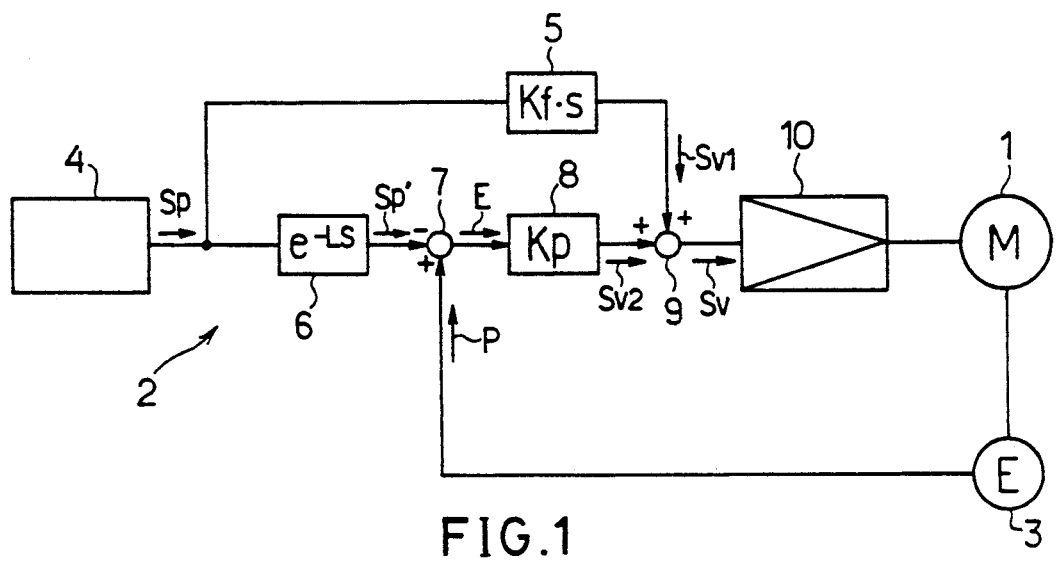
FIG. 1 is a block diagram showing the servo motor control device of an embodiment in accordance with the invention.

An embodiment in which the present invention is applied to a robot will be described with reference to FIGS. 1 through 6. Referring to FIG. 1, a servo motor 1 driving an arm of the robot as a controlled system is controlled by a control device 2 in accordance with the present invention. An amount of revolution of the servo motor 1 or the position of the arm of the robot is detected by a position detector 3 and the result of detection is supplied as a position feedback signal P to the control device 2 or an operation section 7 which will be described later. A sampling control is applied to the control device 2 in this embodiment.

Figure 5:
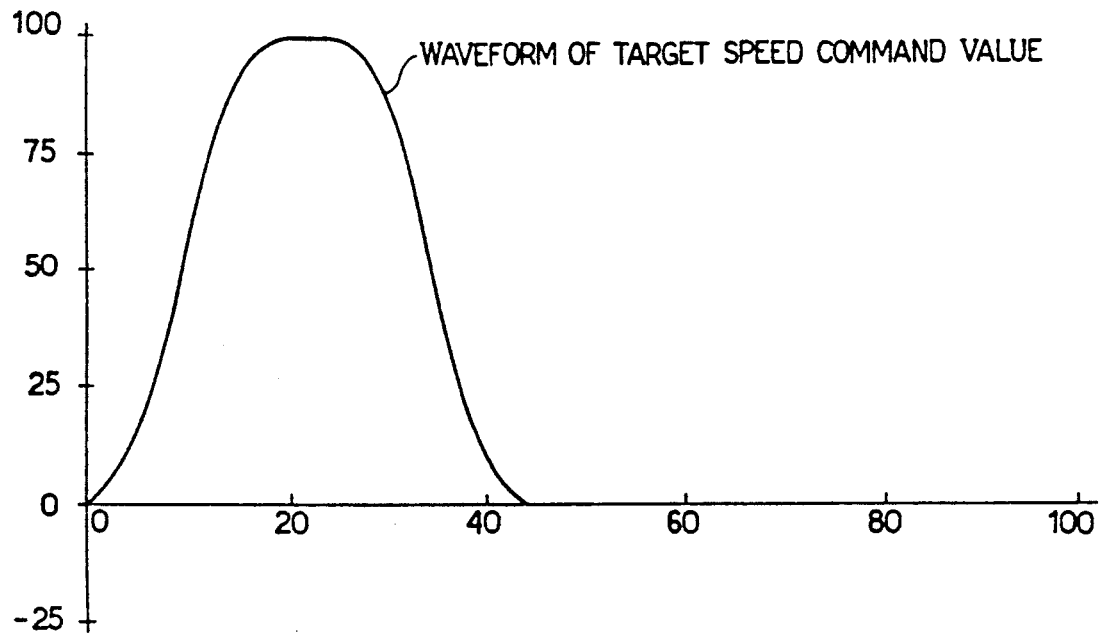
FIG. 5 is a graph showing a waveform of a target speed command signal.
Figure 6:
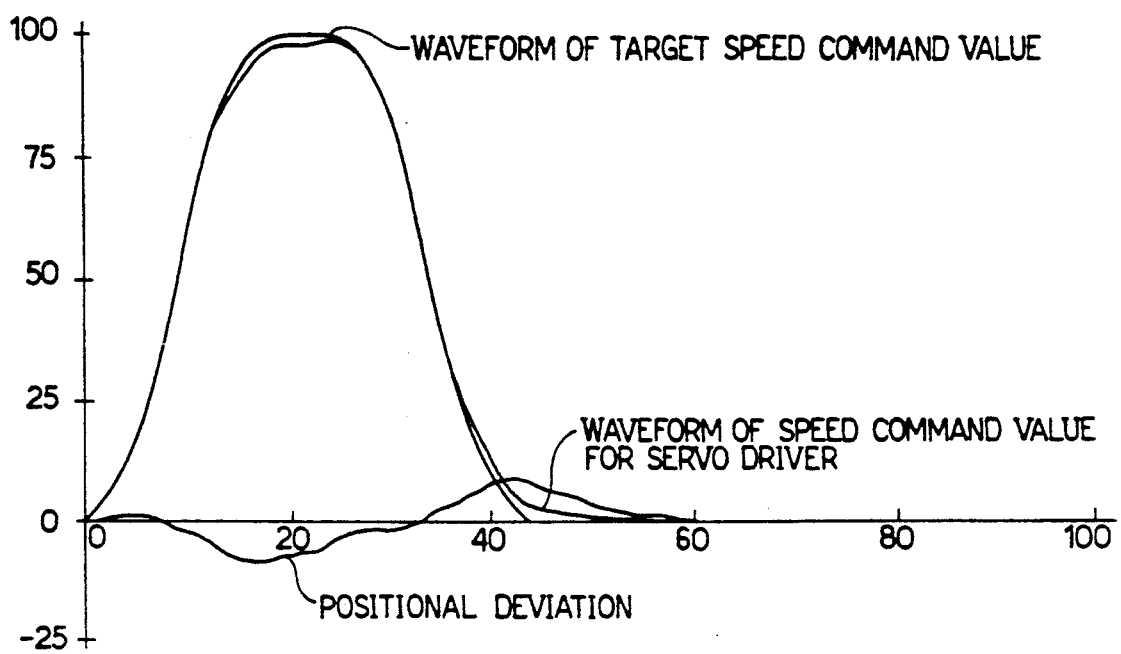
FIG. 6 is a graph showing a relationship between the target speed command signal and a speed command signal.

The control device 2 will be described in detail. A target position command signal $S_p$ is delivered from a speed function generating section 4. A target speed in the case where the robot arm is moved is shown by a trapezoidal smooth curve as shown in FIG. 5, for example. This target speed is integrated and the result of integration is used as a target position command. The target position command signal $S_p$ is input to both a first operation section 5 and a delay section 6 which will be described later. In the first operation section 5, the target position command signal $S_p$ is differentiated and a result of differentiation is multiplied by a speed feedforward gain $K_f$, whereby the first operation section 5 generates a speed command value $S_{v1}$ for the speed feedforward or a speed feedforward signal.

The delay section 6 obtains a target position command signal $S_p'$ delayed by a time period L and the delayed target position command signal $S_p'$ is input to a second operation section 7. In the second operation section 7, a deviation between the delayed target position command signal $S_p'$ and the position feedback signal P is calculated, whereby the second operation section 7 generates a position deviation signal E. The position deviation signal E is input to a third operation section 8. The position deviation signal E is multiplied by a position loop gain $K_p$ in the third operation section 8. A result of this multiplication is generated as a speed compensation command signal $S_{v2}$.

A fourth operation section 9 is supplied with both of the speed feedforward signal $S_{v1}$ generated by the first operation section 5 and the speed compensation command signal $S_{v2}$ generated by the third operation section 8. These signals are added together and the result of addition is supplied as a speed command signal $S_v$ to a servo driver 10. The servo driver 10 drives the servo motor 1 in accordance with the supplied speed command signal $S_v$.

Figure 2:
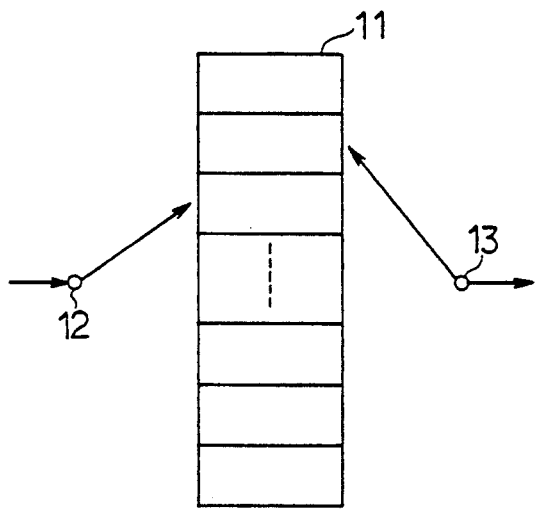
FIG. 2 schematically illustrates a register employed as delay means in the embodiment.

Referring now to FIG. 2, a register 11 is employed as the above described delay section 6 in the embodiment. The target position command signal input to the register 11 is stored in a memory whose location is specified by a input pointer 12 provided in the register 11. Upon completion of the storage, the input pointer 12 moves to a memory of a subsequent location. Simultaneously, a signal in a memory whose location is specified by an output pointer 13 is generated as the target position command signal $S_p'$. Upon completion of generation of the target position command signal $S_p'$, the output pointer 13 moves to a memory of a subsequent location. Locations of the input and output pointers 12, 13 are set in accordance with differences between sampling time periods to be delayed, whereby the generation of the target position command signal $S_p$ is delayed by the lag time period L in the response of the system of the controlled system after the servo driver 10, for example, the system between the servo driver 10 and the position detector 3, by the delay section 6. When the speed command signal $S_v$ is delivered to the servo driver 10 and the servo motor 1 is operated, the position feedback signal P is fed back to the position loop from the position detector 3. The position feedback signal P has a waveform containing the delay time period in its time element.

Figure 9:
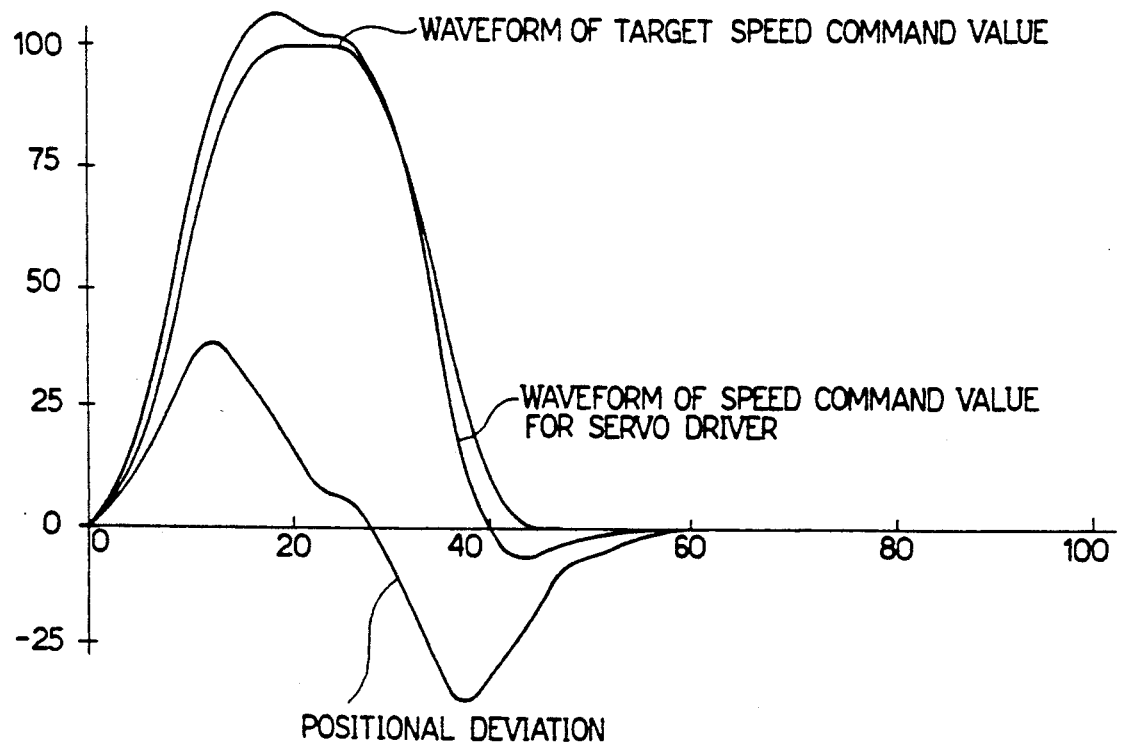
FIG. 9 is a view similar to FIG. 6 showing another conventional arrangement.

As described previously in the description of the prior art, when the control is performed based on a signal containing the positional deviation between the position feedback signal P and a current target position command signal $S_p$, the time lag in the portion of the controlled system after the servo driver 10 is added to the speed command value supplied to the servo driver 10. Consequently, as shown in FIG. 9, the waveform of the speed command value supplied to the servo driver 10 is caused to deviate from the waveform of the target speed command value, which results in occurrence of vibration and a lengthened setting time period.

In the embodiment, however, the positional deviation E is obtained in the third operation section 7 in the state that the time lag between the position feedback signal P produced as the result of operation of the servo motor 1 and the target position command signal $S_p'$ is shortened. Consequently, when an amount $K_f$ of the speed feedforward is previously adjusted to be approximated to 100%, the positional deviation due to the time lag in the portion of the controlled system after the servo driver 10 can be reduced and accordingly, the turbulence in the waveform of the speed command signal supplied to the servo driver 10 can be restrained.

Figure 3:
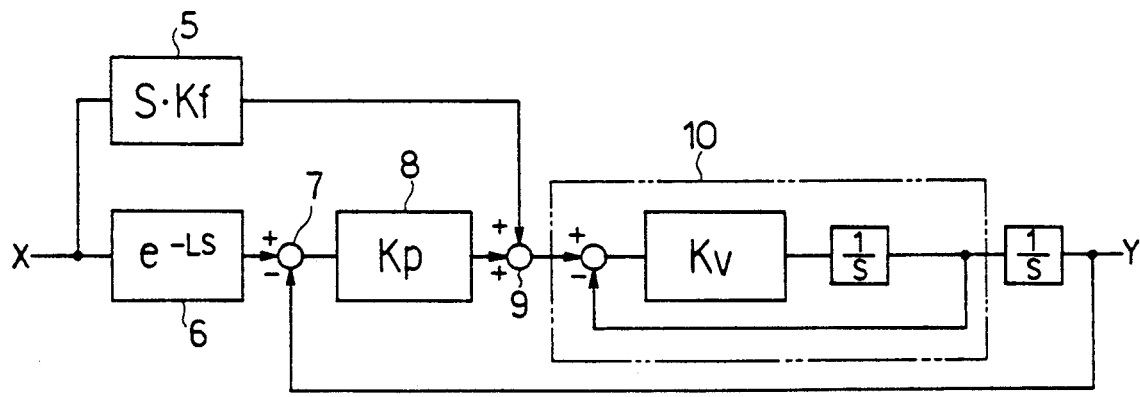
FIG. 3 is a block diagram showing an example of a control model.

Suppose now a control model as shown in FIG. 3. The delay time period L can be determined in this control model as follows. First, a transfer function $G_v$ of the servo driver is represented as follows:

$$G_v = K_v/(S+K_v). \quad (1)$$

Since $$\{S \cdot K_f X + (e^{-LS} \cdot X - Y)K_p\} \cdot G_v/S = Y, \quad (2)$$

a transfer function G of the whole position loop G is represented as:

$$\begin{aligned} G &= Y/X \quad (3) \\ &= (K_v \cdot K_f \cdot S + K_v \cdot K_p \cdot e^{-LS})/(S^2 + K_v \cdot S + K_v \cdot K_p). \end{aligned}$$

In this case, the positional deviation E is represented as:

$$E = e^{-LS} \cdot X - Y. \quad (4)$$

Since $X = 1/S$ in consideration of a step response, the positional deviation E is as follows:

$$E = \{(S+K_v) \cdot e^{-LS} - K_v \cdot K_f\}/(S^2 + K_v \cdot S + K_v \cdot K_p). \quad (5)$$

In the case where $(K_v^2 - 4 \cdot K_v \cdot K_p) > 0 \quad (6).$
the positional deviation E is shown as:

$$E = [\{(-\beta \cdot e^{-LS})/(S+\alpha)\} + \{(\alpha+\beta) \cdot K_f/(S+\alpha)\} + \{(\alpha \cdot e^{-LS})/(S+\beta)\} + \{-(\alpha+\beta) \cdot K_f/(S+\beta)\}]/(\alpha-\beta) \quad (7)$$

where $$\alpha = \{K_v + (K_v^2 - 4 \cdot K_v \cdot K_p)^{\frac{1}{2}}\}/2 \text{ and}$$

$$\beta = \{K_v - (K_v^2 - 4 \cdot K_v \cdot K_p)^{\frac{1}{2}}\}/2. \quad (8)$$

In the case where $K_f = 1$, the positional deviation E is shown as:

$$E = [\{(-\beta \cdot e^{-LS})/(S+\alpha)\} + \{(\alpha+\beta)/(S+\alpha)\} + \{(\alpha \cdot e^{-LS})/(S+\beta)\} + \{-(\alpha+\beta)/(S+\beta)\}]/(\alpha-\beta). \quad (9)$$

Transformed in the region of $t \geq L$ according to the inverse Laplace transform, the above-described equation (9) is shown as:

$$\begin{aligned} E(t) &= \{-\beta \cdot e^{-\alpha(t-L)} + (\alpha+\beta) \cdot e^{-\alpha t} + \\ & \quad \alpha \cdot e^{-\beta(t-L)} - (\alpha+\beta) \cdot e^{-\beta t}\}/(\alpha-\beta) \\ &= [-\beta \cdot e^{-\alpha L} + (\alpha+\beta) + \\ & \quad \{\alpha \cdot e^{-\beta L} - (\alpha+\beta)\}e^{(\alpha-\beta)t}] \cdot e^{-\alpha t}/(\alpha-\beta) \end{aligned} \quad (10)$$

where $e^{-\alpha t}/(\alpha-\beta)$ (11) is a monotonic decreasing function with respect to t and always takes a positive value. Consequently, an amount of error at time t can be compared in the following $\epsilon$:

$$\epsilon = -\beta \cdot e^{-\alpha L} + (\alpha+\beta) + \{\alpha \cdot e^{-\beta L} - (\alpha+\beta)\}e^{(\alpha-\beta)t}. \quad (12)$$

In the equation (12), the value of the term, $e^{(\alpha-\beta)t}$ (13) is exponentially increased with the increase of the time t. Accordingly, when the value of the term, $\{\alpha \cdot e^{-\beta L} - (\alpha+\beta)\}$ (14) can be decreased, the amount of positional deviation in the region where t is increased can be decreased. Finding the value of L holding for $\{\alpha \cdot e^{-\beta L} - (\alpha+\beta)\} = 0$ (15), $$L = [l_n\{((\alpha+\beta) \cdot \alpha)\}]/\beta. \quad (16)$$

This equation (16) provides a measure for determination of the delay time period L in the delay section 6.

Figure 4:
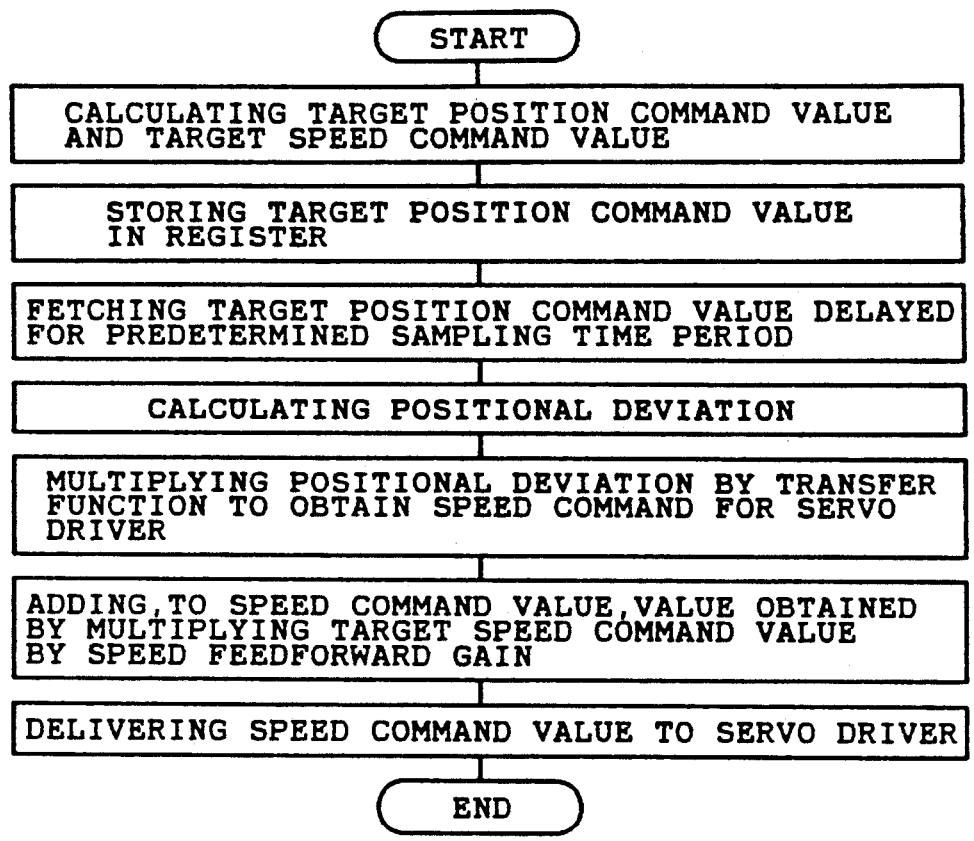
FIG. 4 is a flowchart showing a procedure of processing by a computer.

FIG. 4 shows contents of processing performed by the control section 2 in the embodiment and more specifically, contents of processing performed by the microcomputer per once at predetermined sampling intervals. This processing will not be described in detail here since it has been described in the foregoing description of the arrangement of the control device 2. As the result of this processing, since the input of the target position command signal $S_p$ to the position loop is delayed until the position feedback signal reaches the amount of the speed feedforward signal, influences of the time lag in the response in the portion of the controlled system after the servo driver 10 can be reduced in the obtained positional deviation E. Consequently, the servo driver 10 can be supplied with the speed command signal $S_v$ having a waveform approximated to that obtained by differentiation of the target position command signal based on the positional deviation E having less influence of the time lag.

In accordance with the foregoing embodiment, the delay section 6 is provided for delaying the target position command signal $S_p$ in accordance with the responsibility of the portion of the controlled system after the servo driver 10. Accordingly, the obtained positional deviation E has a reduced error due to the time lag in the portion of the controlled system after the servo driver 10. The influence of the time lag in the responsibility upon the positional deviation E can be restrained as much as possible in the embodiment though the waveform of the speed command value supplied to the servo driver deviates from the waveform of the target speed command value in the prior art. In other words, the speed command signal $S_v$ supplied to the servo driver 10 can be approximated to the target speed command signal as much as possible in the embodiment. Consequently, the sudden change in the acceleration applied to the arm can be restrained, which results in restraint of the vibration of the robot arm and shortened setting time period.

Figure 7:
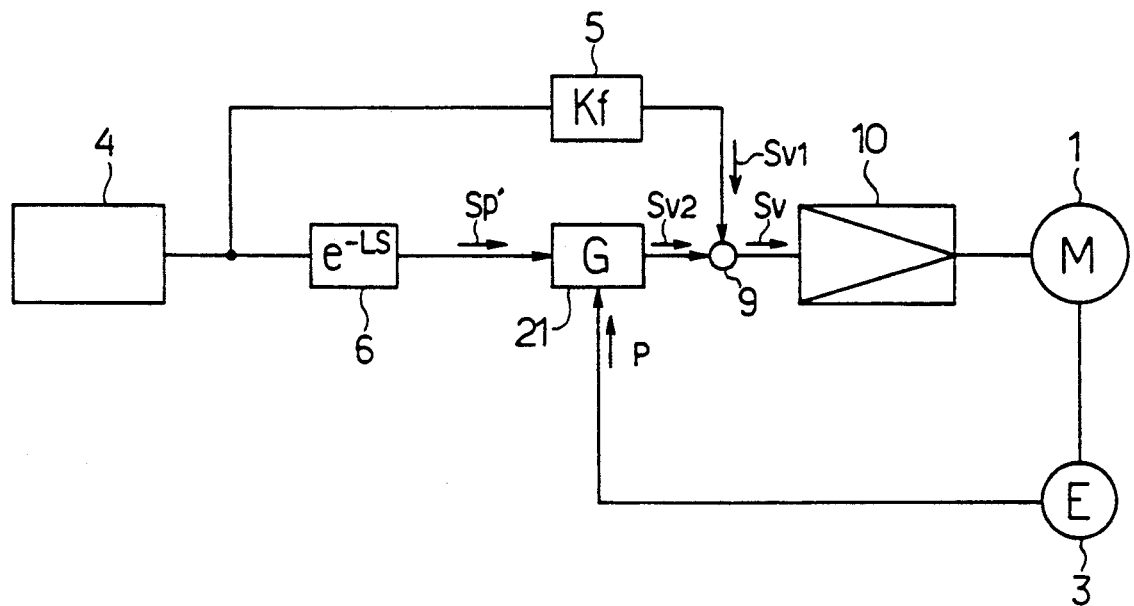
FIG. 7 is a view similar to FIG. 1 showing another embodiment.
Figure 8:
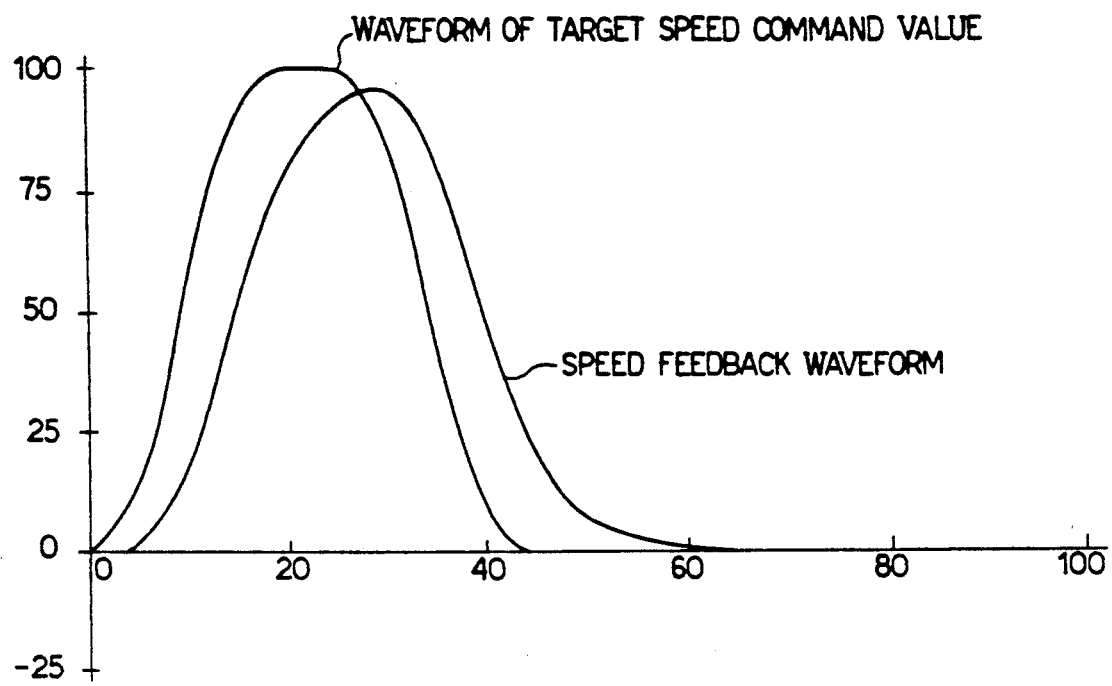
FIG. 8 is a graph showing a relationship between the target speed command signal and a speed feedback signal in a conventional arrangement.

FIG. 7 shows an another embodiment of the invention. In this embodiment, the first and third operation sections 7, 8 are integrated to an operation section 21. The operation section 21 is supplied with both the position feedback signal P from the position detector 3 and the target position command signal $S_p'$ delayed by the delay section 6. The control manners of proportion, differentiation, integration and the like are performed in the operation section 21. As a result, the speed compensation command signal $S_{v2}$ is delivered to the operation section 9 in the position feedback loop. The same effect can be achieved in this arrangement as in the arrangement of the previous embodiment.

The foregoing disclosure and drawings are merely illustrative of the principles of the present invention and are not to be interpreted in a limiting sense. The only limitation is to be determined from the scope of the appended claim.

We claim:

1. A servo motor control device for driving, through a servo driver, a servo motor as a drive source of a controlled system, the servo motor control device comprising:
    a) means for generating a target position command signal for the controlled system;
    b) means for generating a position feedback signal from the controlled system;
    c) means for generating a speed feedforward signal in accordance with the target position command signal;
    d) delay means for delaying the target position command signal in accordance with a response time of a system of the controlled system after the servo driver;
    e) means for comparing the delayed target position command signal with the position feedback signal and obtaining a positional deviation;
    f) means for generating a speed compensation command signal in accordance with the positional deviation; and
    g) means for obtaining a speed command signal whose value is in accordance with an addition of the speed compensation command signal and the speed feedforward signal, and delivering the obtained speed command signal to the servo driver.

2. A servo motor control device according to claim 1, wherein the delay means comprises a register, input and output pointers setting a memory location of the register in accordance with the response time.

* * * * *